Patented Feb. 26, 1924.

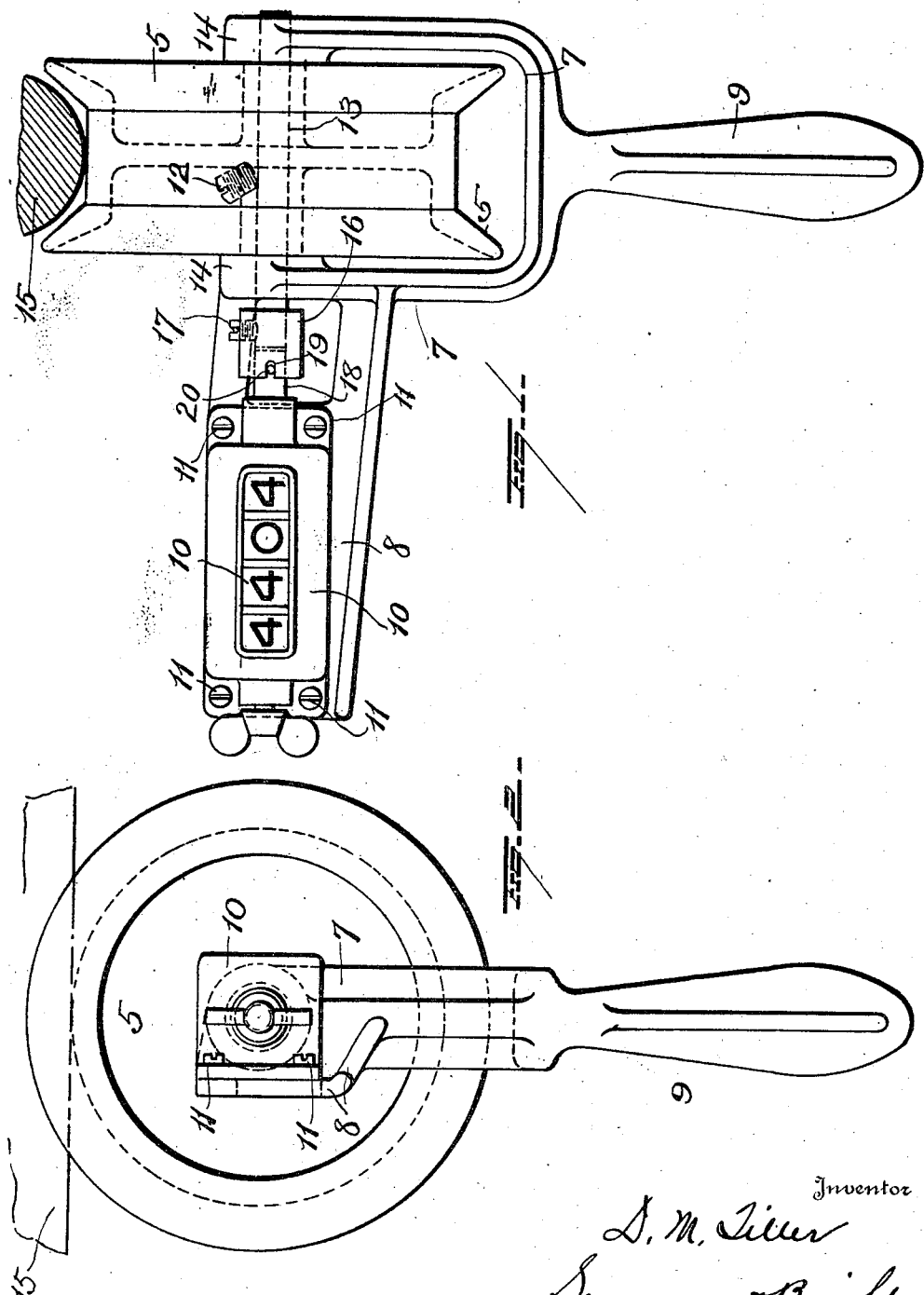

1,485,096

UNITED STATES PATENT OFFICE.

DAVID M. TILLER, OF KANSAS CITY, MISSOURI.

PORTABLE MEASURING DEVICE.

Application filed August 2, 1921. Serial No. 489,319.

*To all whom it may concern:*

Be it known that I, DAVID M. TILLER, a citizen of the United States, and a resident of Kansas City, in the county of Jackson and State of Missouri, have invented certain new and useful Improvements in Portable Measuring Devices; and I do hereby declare the following to be a full, clear, and exact description of the invention, such as will enable others skilled in the art to which it appertains to make and use the same.

My invention relates to an improvement in portable measuring device for measuring the depth of drilled holes or wells at any stage during the process of drilling, the object being to provide a device that can be readily handled and held by one assistant against the drill cable while the latter is being lowered into or withdrawn from a well and accurately register the length of cable and consequently the depth of the hole at any stage of the drilling, and is designed particularly as an improvement on the device shown and described in my application Serial Number 450,947, filed March 9th, 1921.

In the accompanying drawings, Figure 1 is a view in plan of my improved device and Figure 2 is a view in side elevation thereof.

The device comprises a wheel 5, a counter or registering device 10 and a frame 7 having a handle 9 by which the device is held by the operator. The frame is U-shape as shown with the handle projecting centrally therefrom, and one of its side members is provided with an integral shelf or bracket 8 to which the counter 10 is secured by screws 11.

The wheel 5 is secured by a screw 12 to the shaft 13 mounted in bearings 14 at the free ends of the side members of the frame 7, and the said wheel is provided with a peripheral groove to receive the drill cable 15 against which the wheel is forcibly held by the operator. This wheel may be of any size but preferably one foot or a fraction or multiple thereof in circumference, so that each foot of the cable moving against the wheel will be accurately recorded on the counter 10.

The shaft 13 projects through one bearing 14 of the frame 7, and is provided at said projecting end with a coupling sleeve 16 detachably secured to said projecting end by the screw 17. This coupling sleeve 16 receives the end of the shaft 18 of the registering device 10 and is provided with an open slot 19 to receive the pin 20 driven in or otherwise secured to shaft 18 of the registering mechanism, so that when so coupled up the rotation of the wheel 5 will actuate the shaft 18 of the counter or registering mechanism and thus accurately register in feet or fractions thereof the length of cable that has moved in contact with the wheel.

The counter or registering device may be any of the well known forms now in common use, and is mounted in a casing or frame which is secured to the shelf 8 by the screw 11, hence can be readily disconnected from the shaft 13 by removing the screws or by loosening the coupling 16 and moving the latter toward the frame 7 so as to disconnect it from the pin 20.

To operate the device the operator grasps the handle 9 of the frame 7 and holds the wheel 5 in contact with the cable 15. By now lowering the cable in the usual way, the contact of the cable with the wheel, rotates the latter and registers on the register or counter 10 the number of feet of cable that have passed in contact with the wheel, thus indicating the depth of the well. If the drill or other tool be at the bottom of the hole and it should be necessary or desirable to ascertain the depth, the device should be reversed, or turned upside down, and the upward movement of the cable will turn the wheel 5 in the direction to properly register the length of cable withdrawn from the hole, consequently the depth of the hole or well.

The device can be applied to the cable while raising or lowering a drill, bailer or any othr tool employed in drilling wells hence the depth of the hole or well can be ascertained at any time and without the loss of time or any unnecessary operation of the cable actuating means, by simply holding the wheel in contact with the cable while the latter is being lowered or raised, with sufficient pressure to cause wheel 5 to be rotated by such contact.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters Patent, is:—

1. A portable device for measuring the depth of a drilled hole or well consisting of a frame, a shaft journaled therein, a shelf on said frame and in line with the shaft journaled in said frame, a counter detachably secured to the frame, a shaft constituting a part of said counter device, a wheel secured to the shaft in the frame and adapted to be turned by contact with a drill cable, and a coupling sleeve detachably secured to the wheel shaft and also detachably connected with the shaft of the counter so that the latter may be removed without removing the coupling sleeve, or the latter may be disconnected from the shaft in the frame so that the rotation of said latter shaft will not be imparted to the shaft of the counter.

2. A portable device for measuring the depth of a drilled hole or well consisting of a frame, a shaft journalled thereon, a shelf rigidly secured to said frame and in line with the shaft carried by the latter, a counter detachably secured on said shelf with its shaft in line with the shaft journalled in the frame, and having a laterally projecting pin, a coupling sleeve detachably secured to the shaft in the frame and provided with an open slot to receive the pin on the shaft of the counter, and a wheel secured to the shaft journalled in the frame and adapted to be turned by contact with a drill cable, the construction being such that the counter may be removed without disconnecting the coupling sleeve, or the latter may be disconnected from the shaft in the frame so that the rotation of the shaft in the frame will not be imparted to the shaft of the counter.

In testimony whereof, I have signed this specification in the presence of two subscribing witnesses.

DAVID M. TILLER.

Witnesses:
E. E. HARRINGTON,
T. W. VAN DYKE.